United States Patent
Ruesch et al.

(10) Patent No.: US 6,535,830 B2
(45) Date of Patent: Mar. 18, 2003

(54) SCALED QUADRATURE PULSE SIGNAL GENERATOR

(75) Inventors: James R. Ruesch, Lindenhurst, IL (US); Bryan P. Haynes, Libertyville, IL (US); Arthur J. Degner, Zion, IL (US)

(73) Assignee: Liquid Controls, Inc., Lake Bluff, IL (US)

( * ) Notice: Subject to any disclaimer, the term of this patent is extended or adjusted under 35 U.S.C. 154(b) by 0 days.

(21) Appl. No.: 09/838,523

(22) Filed: Apr. 19, 2001

(65) Prior Publication Data

US 2002/0035441 A1 Mar. 21, 2002

Related U.S. Application Data

(60) Provisional application No. 60/221,581, filed on Jul. 28, 2000.

(51) Int. Cl.[7] .......................... G01L 27/00; G06F 19/00
(52) U.S. Cl. .......................... 702/100; 702/45; 702/50; 73/1.59; 73/23.25
(58) Field of Search ........................ 702/45, 50, 85–86, 702/99–100; 318/600, 604, 605; 341/112, 115, 116–117; 73/1.59, 1.73, 23.24, 23.25

(56) References Cited

U.S. PATENT DOCUMENTS

| | | | |
|---|---|---|---|
| 4,558,304 A | * 12/1985 | Wand | 341/116 |
| 4,697,125 A | * 9/1987 | Goff et al. | 318/600 |
| 5,126,754 A | * 6/1992 | Spinar et al. | 346/29 |
| 5,895,863 A | * 4/1999 | Glaudel et al. | 73/861.01 |
| 5,926,122 A | * 7/1999 | Dalton | 341/117 |

* cited by examiner

*Primary Examiner*—Bryan Bui
(74) *Attorney, Agent, or Firm*—Cook, Alex, McFarron, Manzo, Cummings & Mehler, Ltd.

(57) ABSTRACT

A scaled quadrature pulse output signal is generated for representing direction and volume in predetermined increments of the flow of a liquid or a gas through a meter. An unscaled pulse signal is received from a meter. A scaling factor is applied to each unscaled pulse signal for accurately representing an increment of volume. The increments are sequentially added or subtracted to/from one another (depending upon flow direction) and a scaled quadrature output signal is provided for indicating the direction of flow and the volume of flow in predetermined increments.

14 Claims, 4 Drawing Sheets

Channel A leads Channel B. K-factor of 8. Each edge increases total by 0.001b

Channel B leads Channel A. K-factor of 8. Each edge decreases total by 0.001b

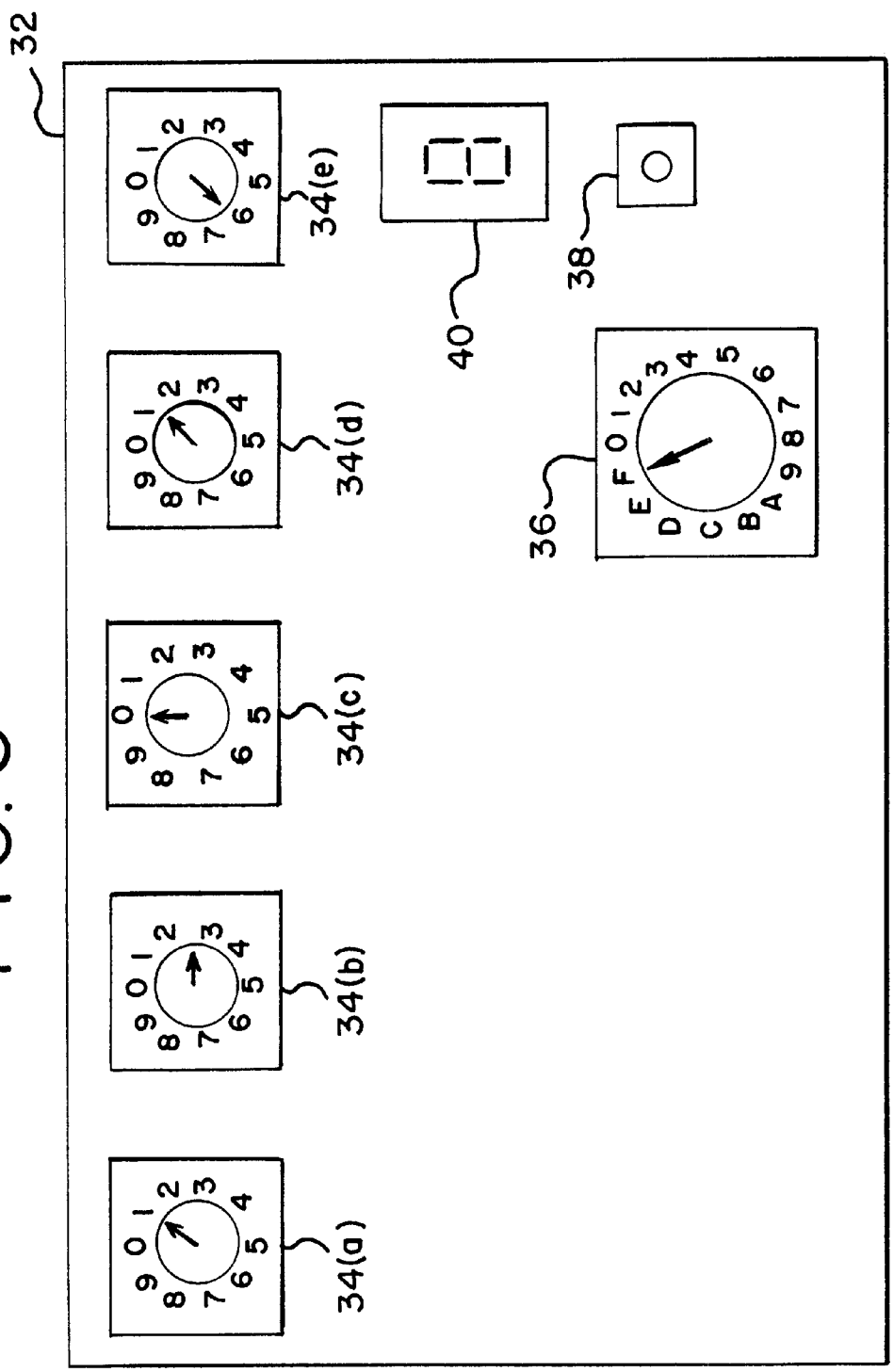

SCALED QUADRATURE PULSE SIGNAL GENERATOR

RELATED APPLICATION

This application claims priority to U.S. provisional application having Ser. No. 60/221,581, filed Jul. 28, 2000, entitled "Scaler for Quadrature Pulse Encoder" and is hereby incorporated herein by reference.

FIELD OF THE INVENTION

The present invention is directed at an improved method and apparatus for measuring the quantity of a liquid or gas through a flow meter. Specifically, the present invention provides a scaled quadrature pulse output signal from an unscaled flow meter input signal.

BACKGROUND OF THE INVENTION

Rotary motion flowmeters include all positive displacement (PD) and turbine types. Also included in this category are metering pumps of many types. Almost all rotary meters today are of the type where the rotary motion of the meter is nominally proportional to the rate of flow through the meter and the motion is converted to a set of pulses using a rotary shaft encoder. Flowmeters that meet these criteria include gasoline dispenser meters, household water meters, and natural gas meters.

Rotary motion flowmeters have existed for many years, the most common of which is the PD flowmeter. PD flowmeters use the rotational displacement of the shaft to represent a fixed volume per revolution and are equipped with mechanical counting devices that provide a readout of the volume of flow that passes through the meter. (A mechanical counter is a series of wheels with the numbers 0 through 9 arranged in decades such that the lesser significant digit wheel increments the next most significant digit wheel by one count each time it completes one full revolution. A common example of such a mechanical counter is the odometer of an automobile.) Because of different displacement volumes of different size flowmeters, in order to calibrate the mechanical counter to readout in meaningful flow units such as gallons or liters, a gear train is typically used to reduce or increase the speed of rotation to the counter. If high precision of the flowmeter is needed, a fixed nominal gear ratio is insufficient to account for differences between meters due to variations in the manufacturing process. Individual meter calibration and a fine tuning mechanism must be put in place to accomplish high accuracy calibration to meet weights and measures metering standards (on the order of plus or minus 0.2% of actual). Even with a fine tuning mechanism to initially calibrate the flowmeter, the meter may be accurate over only a limited range of flowrates because of its non-linear behavior over a wider range.

Both forward and reverse counting is possible with many flowmeters equipped with mechanical counters. A symmetrical PD flowmeter can be flowed through in either and/or both directions counting up during forward flow and back down during reverse flow.

With the advent of electronics, the need to convert the rotary motion of the PD meter into electronic signals became apparent. Replacing the mechanical counter with a rotary pulse encoder of some type became commonplace. Initially, the calibration of the pulses, which could be counted or "totalized", was accomplished using gearing where the gear ratio of the pulse encoder could be adjusted to make each pulse represent a known unit of volume. In order to distinguish between forward and reverse flow, the most common technique uses a rotary encoder with two pulse output channels where one channel is offset from the other by 90 degrees in phase relationship. When channel A leads channel B, the counting electronic circuit interprets the flow as forward and counts up. When channel B leads channel A, the counter interprets the flow as reverse and counts down. This is known as a quadrature encoder.

When digital logic and microprocessors became popular, the need for gearing the raw encoded signal was reduced because pulse weighting could be handled by scaling the received counts by a mathematical scaling factor to obtain the desired output result. Many electronic counting registers exist that receive unscaled flowmeter pulses from a pulse encoder then apply a calibration factor or pulse weighting factor to the received count.

Despite such advances in the art of flow meters, there has not been provided an electronic flow meter that produces a scaled quadrature pulse output signal.

SUMMARY OF THE INVENTION

The present invention is directed at an apparatus and method for providing an accurate measurement of the flow rate of a liquid or gas under varying conditions. In general, the product flow generates a series of unscaled pulses. The pulses are applied to a pulse scaler that applies a weight factor to each pulse based upon select conditions. The scaled pulse weight is added to or subtracted from a fractional totalizer. Preferably, the fractional totalizer is in binary format having a half-bit and a quarter-bit for indicating ¼, ½, ¾, and 1 unit of product volume.

Preferably, a rotary shaft encoder provides a plurality of pulses per unit of product volume. The number of pulses produced per unit volume defines the maximum resolution for volume measurement. For example, the rotary shaft encoder may provide approximately 1000 pulses per gallon of product. The encoder pulses are dependent upon rotary motion only and are thus unscaled. The unscaled pulses are preferably next scaled by applying a weight factor to each pulse. For example, as temperature decreases, the weight factor may increase the weight for each pulse by a percentage. The weight factor is applied to the pulse weight to obtain a scaled pulse. For example, an unscaled pulse may represent ¹⁄₁₀₀₀ (0.001) of a gallon. Based upon one or more conditions, the weight factor may increase the pulse volume representation by a 1.0005 multiplier. Thus, in this example, the scaled pulse will represent 0.0010005 gallon. A totalizer receiving the pulse adds (or subtracts, depending upon flow direction)0.0010005 to the volume total as each pulse is received, provided the weight factor remains unchanged. A totalizer value-tester represents the volume total in binary format and provides a two bit output representing when the volume total is at or over ¼, ½, ¾, or 1 gallon. The two bit output may be provided to a counter system and display device for providing a visual representation of the volume total.

The two bit output also indicates the direction of product flow. For example, if the half-bit and quarter-bit combination change from 0 0 to 0 1, then the product flow is moving in the positive direction. However, in this example if the half-bit and quarter-bit combination change from 0 0 to 1 1, then the product flow is moving in the negative direction.

Thus, the rotary motion flowmeter produces a scaled quadrature pulse output signal that essentially reacts in real time. This technique allows the pulse train to contain direction of flow information and allows scaled real time pulses to be temperature volume compensated. Through this method, the pulses may also be scaled non-linearly to correct any inherent non-linearity in the measurement system thus producing a linear result.

BRIEF DESCRIPTION OF THE DRAWINGS

FIG. 5 is an illustration of a user interface in the preferred embodiment of the present invention.

DETAILED DESCRIPTION OF THE PREFERRED EMBODIMENT

Figure 1:
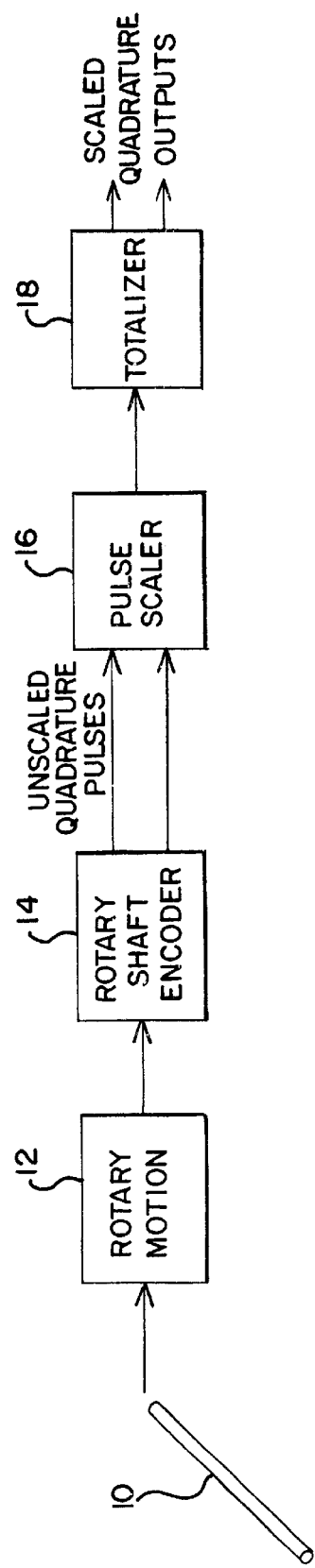
FIG. 1 is a block diagram of a flow meter system that includes components of the present invention.

A block diagram of a system that includes the preferred embodiment of the system of the present invention is illustrated in FIG. 1. The flow of a liquid or gas, confined to a conduit 10, causes motion to a rotor or some other device. The rotary motion 12 causes a rotary shaft encoder 14 to output a plurality of unscaled pulses along two channels, offset with respect to one another by 90 degrees. The encoder that produces the unscaled quadrature pulses may be an optical encoder attached to a meter blocking rotor via a magnetic coupler. In this arrangement, the electronics chamber is isolated from the meter element. Alternatively, the encoder may be driven directly by the packing gland of the meter. A static o-ring seal may provide a seal between the pulser electronics enclosure and a cover for the meter. While the encoder/meter arrangement discussed herein are elements of the preferred system, the encoder/meter is in the prior art.

The unscaled pulses from the encoder are scaled by a pulse scalar 16 in accord with select conditions, as discussed below. The pulse scalar output is provided to a totalizer 18, the output of which indicates both the quantity and the direction of flow. The functions described above may be performed by separate devices or several functions may be performed by the same device. For example, in the preferred embodiment, an 8-bit microprocessor receives the unscaled pulses from the rotary shaft encoder and performs the functions of the pulse scalar 16 and the totalizer 18, and provides a scaled quadrature pulse output signal. It is preferred that the microprocessor board and the encoder are housed in a cast aluminum explosion proof housing that mounts directly to a flow meter. The electronic components for the pulser are preferably located on a single PC board. In another embodiment, the PC board may be located in a dispenser head, along with other dispenser electronics and display elements.

Figure 3:
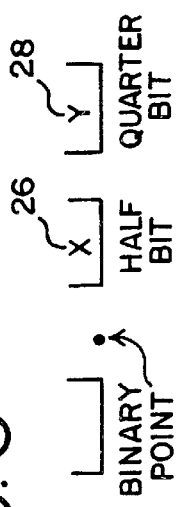
FIG. 3 shows the placement of binary digits referenced in the preferred embodiment.
Figure 2:
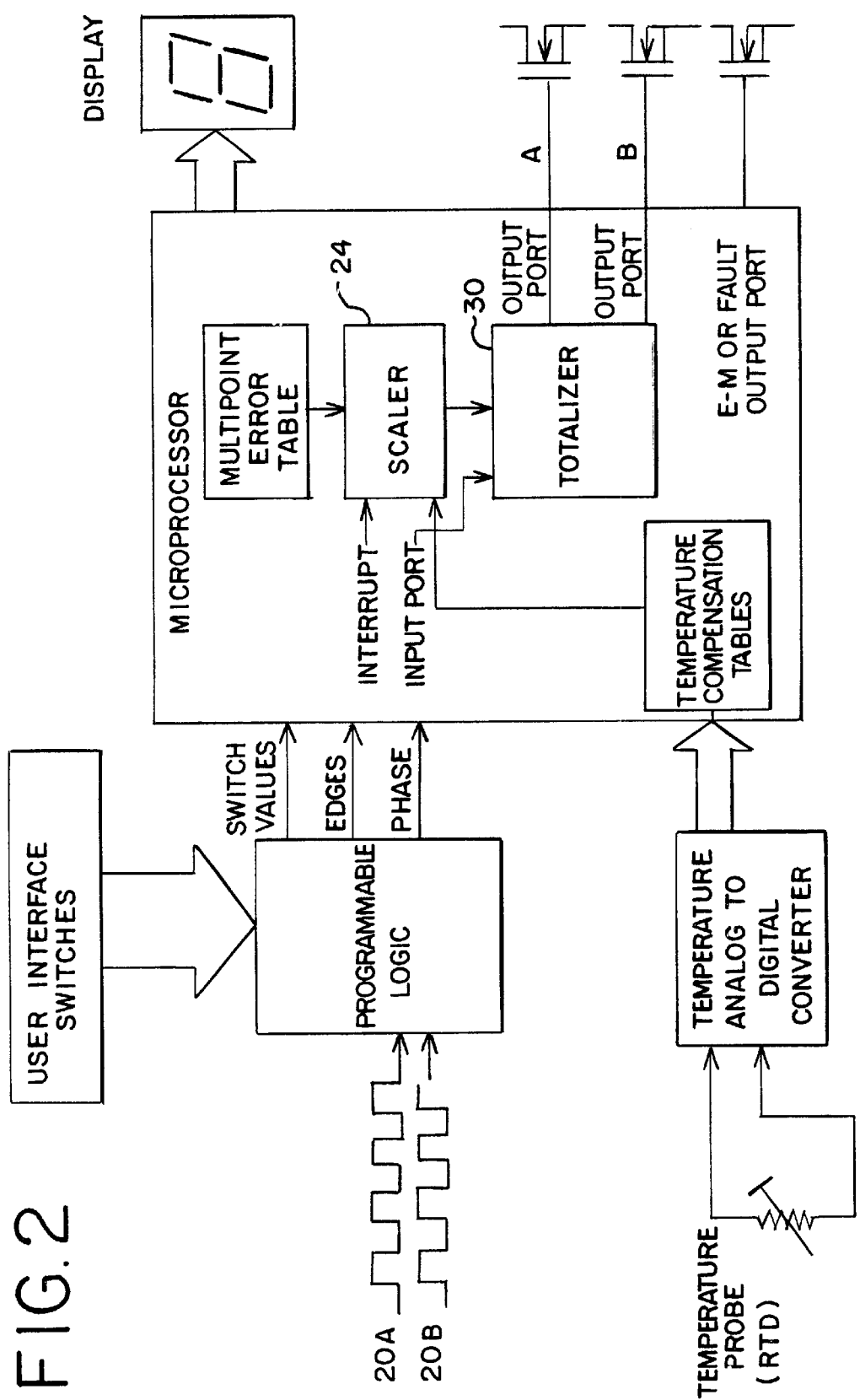
FIG. 2 illustrates in more detail several aspects of a preferred system of FIG. 1.
Figure 4A:
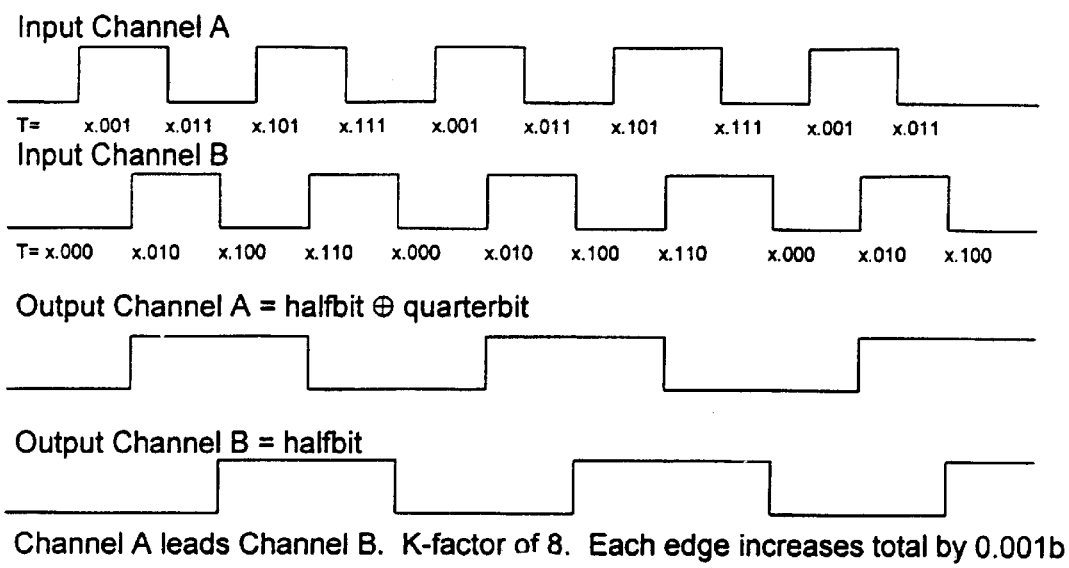
FIGS. 4a and 4b are illustrations of a scaled quadrature output signal produced by the preferred embodiment of the present invention.
Figure 4B:
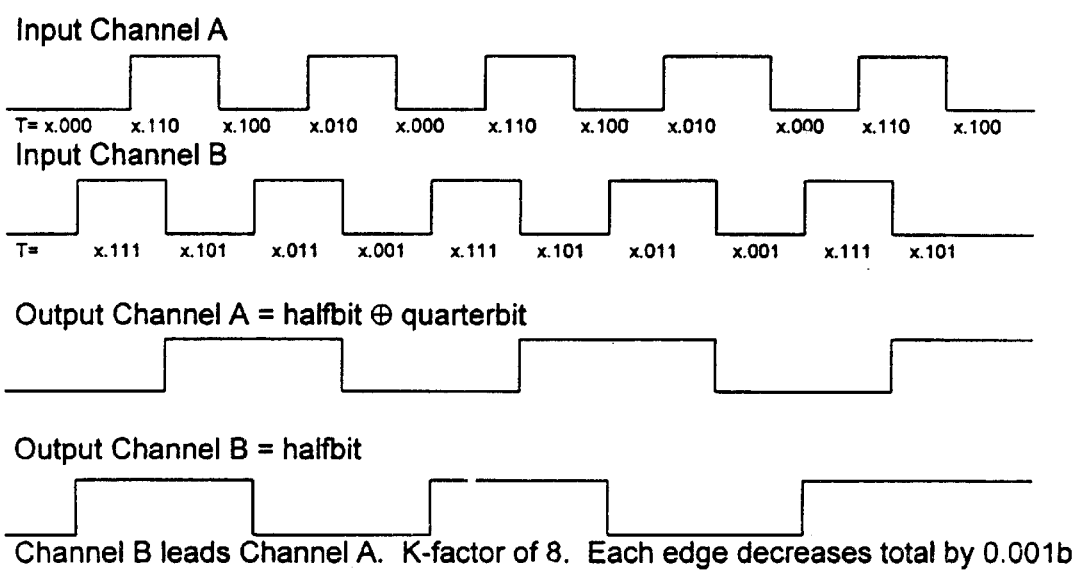

Functional details of the system of the preferred embodiment of the invention are illustrated in FIGS. 2–4. A rotary shaft encoder 14 provides two series of pulses 20A and 20B in response to product flow through conduit 10. As explained below, a second pulse train 20B is offset from a first pulse train 20A by 90 degrees for determining flow direction.

A microprocessor is provided and programmed for receiving and scaling received pulses. In the preferred embodiment, a rising or falling edge of a pulse from either pulse train 20A or 20B causes an interrupt to the microprocessor. The quantity of product flow represented by each pulse edge may be adjusted to reflect an accurate amount, as product quantity may vary based upon mechanical differences between flow meters, temperature, flow rate, and other factors. Pulse quantity representation is adjusted by applying a weight factor to each pulse.

The phase of the A and B pulses is provided as a second input to the microprocessor to discriminate flow direction of the unscaled pulses. The weight factor represented by each pulse edge is added to or subtracted from a totalizer depending on the state of the flow direction discriminator.

The microprocessor preferably represents total product quantity in binary format. As represented in FIG. 3, the bit to the immediate right of the binary point is referred to as the half-bit 26, because this bit changes its state to "1" only when the fractional portion of the quantity is greater than or equal to ½ but less than a whole unit. The half-bit 26 changes its state to "0" only when the fractional portion of the quantity measurement is greater than or equal to a whole unit but less than ½.

The bit to the right of the half-bit is referred to as the quarter-bit 28. The quarter-bit 28 changes its state (between "1" and "0") only when the fractional portion of the quantity measurement transitions between ¼, ½, ¾ and whole units of measurement.

In the preferred embodiment, the half-bit and quarter-bit are utilized by a totalizer 30 to generate a quadrature pulse output that indicates, in a simplified manner, flow quantity and direction. A first output channel A of the totalizer is provided that has a "1" state when the half-bit and quarter-bit are at "0", "1" or "1", "0" respectively. Thus, an exclusive-OR of the half-bit and quarter-bit of the encoder will produce output channel A. Output channel A will be high when the quantity measurement is greater than or equal to ¼ but less than ½ and greater than or equal to ¾ but less than whole; otherwise it will be low.

A second totalizer output channel B is provided that is high when the half-bit is at "1"; otherwise it will be low. Thus, the state of output channel B matches the state of the half-bit of the totalizer.

In summary then, in the present embodiment two output port lines are driven to their ON or OFF states by evaluating bit patterns produced by a totalizer. When the binary values of the half bit/quarter bit combination equal 01 or 10, a channel A output is set to 1. When the binary values of the halfbit/quarter bit combination equal 00 or 11, the channel A output is reset to 0. When the binary value of the half bit equals 0 or 1, a channel B output is set to 0 or 1, respectively. This technique produces a quasi-quadrature scaled pulse output (i.e. sequencing of the pulses is the same as quadrature but the actual phase between A and B will vary due to scaling).

Thus, in the preferred embodiment, pulse A and pulse B of the quadrature provide a basis upon which to measure product flow. If pulse A leads pulse B, then product flow is in the positive direction and if pulse B leads pulse A then product flow is in the negative direction. Referring to FIG. 4, therein is illustrated an example where pulse A leads pulse B. In this example, the product quantity measurement increases by ⅛ at the occurrence of each pulse edge. A raw encoder produces a pulse resolution that is greater than the least significant digit of the scaled pulse output wanted. For example, if the scaled pulse output needed is in increments of one one-thousandths of a gallon, then the unscaled encoder must put out at least 1000 pulse edges per gallon.

Each unscaled pulse as it is received is scaled then added to or subtracted from a fractional totalizer (depending on the input encoder phasing). When the value of the fractional totalizer reaches one-half a unit the scaled B output is switched from off to on and when the fractional totalizer reaches a whole unit the B output is switched from on to off. The A output is switched when its value reaches a quarter unit and three-quarters unit respectively. The net effect of this technique is to electronically produce a scaled quasi-quadrature pulse output from an unscaled quadrature input in a real time fashion.

In the preferred embodiment a microprocessor is utilized for receiving the pulses from the unscaled encoder and is fast enough to receive a pulse edge, scale it, add it to or subtract it from a totalizer, test the resulting value and manipulate its outputs before the next pulse edge. A P89C51RD2HBA microprocessor from Philips Semiconductor, New York, N.Y., is preferred. There is a limit to the frequency bandwidth of the incoming pulses. The microprocessor must execute instructions to process the pulse interrupt faster than the incoming pulse frequency. Incoming pulse frequencies of 10,000 cycles per second have been demonstrated using this technique.

Because each incoming pulse edge is given a weight factor before it is added to the fractional totalizer, it is possible to apply a varying weight to each input depending on other measured conditions such as the flow rate, the product temperature or the product density for example. Preferably, the microprocessor has sufficient bandwidth when not processing pulses to do other calculations. By measuring the number of pulses per unit of time, the pulse rate can be determined which allows for different pulse weights at different flow rates thus correcting for meter non-linearity. The microprocessor may poll a temperature sensor for example and have temperature correction algorithms stored in memory. This allows the unit to perform temperature volume compensation using the standards published by the American Petroleum Institute, for example.

The advantages of using this new technique are many. A small circuit board containing the circuitry described above can easily be attached directly to the flowmeter and contain all the necessary calibration factors to correctly scale the meter and even correct non-linearity of the meter. The end user simply needs to count and totalize the pulses coming from this circuit board. Present day gasoline dispensers gear the meter and drive an encoder such that it produces exactly 1,000 pulses per gallon, which are then counted and displayed at the dispenser head. In the present invention, however, not only can the pulse output be scaled to precisely 1,000 pulses per gallon, but also the meter's range can be expanded into its non-linear region and the pulses can be compensated to net volume by adding the temperature compensation curves to the software. In the LPG dispenser market temperature compensation is an important feature that is costly to do mechanically. In the Canadian market, all refined fuels presently allow temperature volume correction.

The system of the present invention thus provides a quadrature output pulse signal configured such that each edge of the output pulse signal represents a known and predetermined quantity of product. The output pulse signal may be based upon an uncalibrated pulse encoder.

For example, it may be determined that an uncalibrated encoder produces 1,088 pulses/gallon of diesel fuel. Thus, on two channels (to incorporate the quadrature feature) there are 2,176 pulses/gallon, providing a total of 4,352 edges/gallon. If it is desired to have an output quadrature signal where each edge represents 0.1 gallon, a conversion factor between the input and output pulse signals may be calculated as 4,352÷10=435.2. The conversion factor is referred to herein as the k-factor. Thus, the output signal is produced based upon a frequency $1/435.2$ of the input signal. The conversion factor k may be adjusted based upon properties of the product being measured i.e., its reaction to outside influences, such as temperature and flow speed. Such adjustments are preferably implemented by a microprocessor and may include non-linear as well as linear adjustments. Non-linear adjustments may be accommodated through a multi-point calibration technique, as explained below.

In the preferred embodiment, the encoder can be attached to the meter blocking rotor via a magnetic coupler in order to isolate the electronics chamber from the meter element and eliminate the dynamic seal (packing gland) or can be driven directly by the output shaft of a flowmeter. The pulse scaler electronics are preferably located on a single electronic PC board which may be located in the dispenser head along with the other dispenser electronics and display elements. The unscaled encoder pulses are preferably fed into interrupt ports of a microprocessor via a programmable logic chip, where each edge (both rising and falling) is processed in real time. In this embodiment, the bandwidth of the microprocessor calculator must handle the highest frequency produced by a meter running at full speed. The microprocessor preferably calculates the appropriate pulse weighting based on the gross scale factor (k-factor=unscaled pulse edges per output pulse), multi-point error interpolation adjustment, and volume compensation factor (VCF), if applicable. As discussed above, this pulse weight is either added to or subtracted from (depending on phase) a continuously running totalizer in binary whose resolution is much greater than the needed pulse output accuracy. Calibration constants are preferably input to the microprocessor's non-volatile parameter storage memory via a function selector switch, a bank of five BCD digit switches, and one pushbutton switch. Annunciation of status of the electronics is preferably via a single seven-segment light emitting diode (LED) that displays a variety of alpha and numeric characters sequentially. The pulser circuitry preferably consists of a single printed circuit board with terminal blocks for user field wiring connections.

In the present embodiment, 32 parameters may be programmed into the system. Preferably, a switch is provided for selecting a parameter and a set of binary coded decimal switches are provided for receiving parameter variables. The function switch preferably has 16 positions labeled 0 through 9 and A through F, which allows up to 16 different functions to be digitally programmed using five binary coded decimal (BCD) switches for data entry. A two position jumper plug is provided in conjunction with the function switch to select one of two banks. This allows for the programming of up to 32 distinct functions.

In the present embodiment, four BCD switches represent four significant digits of a numerical value. A fifth switch represents the decimal point position within the set of four digits. For example, a setting of 15633 represents the number 1.563 (1563 with three decimal places). A zero in the first significant digit designates that the number is negative. For negative numbers, therefore, there are only three significant digits. Negative numbers are needed for multi-point calibration percentage error inputs and for negative temperature offset adjustments.

In bank 1, in the present embodiment the system is preferably programmed in accord with a multi-point setup mode. As discussed below, up to sixteen points can be programmed in bank 1, one for each function switch position. The system operates as a gross pulser with the k-factor previously entered in bank 0 function 0 but will not apply any multi-point calibration offsets. If the flow rate is not zero when the pushbutton switch is pressed, the system memorizes the present flow rate as the desired multi-point rate input. If the flow rate is zero, the system memorizes the switch values as a percentage error at the previously established flow rate. (A zero in the first digit indicates a negative value for the remaining switches). Alternatively, at zero flow the flow rate in Hertz can be directly entered for integer values greater than 3.000. Values less than or equal to 3.000 and greater than or equal to −3.00 will be regarded as multi-point percentages.

The select functions, discussed below, are preferably programmed in the system via a complex programmable logic device, such as CPLD XC9572XL-10VQ641, manufactured by Xilinx. The following table provides an overview of the bank 0 functions provided in the preferred embodiment:

TABLE A

Programming Switch Functions Bank 0 (Table "xx" refers to API Standard Table; $NH_3$ table refers to Industry Canada Standard Table)

| Function Number Gross or Compensated (Net) Multi-point (On or Off) | Function or VCF Table Type | Range of Values |
|---|---|---|
| 0 gross/multi-point On | Gross k-factor (input pulse edges/pulse out) | 4.000 to 9999 |
| 1 net/multi-point On | Compensate linear F | 0 to 0.0025/degree |
| 2 net/multi-point On | Compensate linear C | 0 to 0.005/degree |
| 3 net/multi-point On | Compensate Table 24 | 0.500 to 0.550 SGU |
| 4 net/multi-point On | Compensate Table 54 | 0.500 to 0.600 SGU |
| 5 net/multi-point On | Compensate Table 54A | 610.5 to 1075.0 kg/m$^3$ |
| 6 net/multi-point On | Compensate Table 54B | 653 to 1075 kg/m$^3$ |
| 7 net/multi-point On | Compensate Table 54C | 0.000486 to 0.001674/degree |
| 8 net/multi-point On | Compensate Table 54D | 800 to 1164 kg/m$^3$ |
| 9 net/multi-point On | Compensate Table 6B | 0 to 85 API gravity |
| A net/multi-point On | Compensate $NH_3$ | 0 |
| B gross/multi-point Off | Reserved | Reserved |
| C gross/multi-point Off | Temp. unit selection | 1 = Celsius, 2 = Fahrenheit |
| | Temp. calibration values (based on platinum scale resistor) | 100.0 or 128.6 ohm |
| | Temp. offset calibration adjustment | −0.300 to +.3000° C. or −0.540 to +.5400° F. |
| D gross/multi-point Off | Serial Comm. Device Device node address (digital address of board) | 1 to 255 |
| | Comms. baud rate (kbps) | 57.6, 19.2, 9.6, 4.8, or 2.4 |
| E gross/multi-point Off | Display mode for last error code | 0 to clear the last error code |
| F gross/multi-point Off | Gross k-factor for E–M output pulse (input pulse edges/pulse out) | 4.000 to 9999 |

The first function (Function O) is for programming the gross k-factor, i.e., the uncompensated conversion factor for a flow meter. As discussed above, the conversion factor is based upon a number of expected input edges for a designated quantity of product and a corresponding desired number of output pulses. The gross k-factor is preferably determined at the highest expected number of input pulses per second (highest flow rate). In one embodiment, the gross k-factor is within the range of 4.000 to 9999. When the switch is set for selecting the first parameter, the pulse encoder functions as a gross pulser with multi-point error correction factors applied. The multi-point error correction factors are preferably programmed in accord with functions 0–9, and A–F in bank 1 as described below. In each function, from 1 through A of bank 0, the k-factor is adjusted in accord with a select parameter using temperature compensation curves derived from formulas for different tables.

The k-factor may be adjusted for a plurality of flow rates, each flow rate being corrected by a percentage adjustment to the k-factor. In the preferred embodiment, there are 16 programmable multi-point error points. The multi-point error points account for the non-linearity of the flow meter over a range of flow rates, for example. Thus, flow meter accuracy may be linearized at up to 16 points over the flow range. Multi-point calibration permits compensation for inherent meter error across the full range of flow rates for the meter, thereby providing near-perfect meter accuracy for deliveries from maximum flow to minimum flow.

Two data entries are required for each linearization point to complete a multi-point calibration: i.e., specification of a target flow rate, expressed in pulse edges per second, and specification of a percentage error at that flow rate as determined by prior runs or by reference to a meter calibration sheet. Each multi-point error point can be set for a percentage adjustment (positive or negative) corresponding to a selected pulse rate. In the preferred embodiment, the pulse rate is calculated every 0.5 second and the k-factor is adjusted as necessary. For example, the gross k-factor for a particular fluid may be accurate at 5,000 pulses/second, but may require a 0.1% adjustment at 3,000 pulses/second and a 0.2% adjustment at 2,000 pulses/second. If the pulser system detects that the pulse rate has reduced from 5,000 to 3,000 pulses/second, the microprocessor automatically adjusts the k-factor by 0.1%. These adjustments may be programmed directly into the system for fine tuning the flow rate measurement.

FIG. 5 shows a control panel 32 for a pulser conditioner having components in accord with the present embodiment. The control panel includes five data switches 34(a)–34(c), a function switch 36, a pushbutton 38, and an LED display 40.

The preferred method for programming the system to accept k-factor percentage adjustments is as follows: To record a flow rate, the pushbutton switch is pressed at the desired flow rate, which directs the microprocessor to memorize the current pulse rate. To record an error percentage, the pushbutton is pressed when the flow rate is zero and the microprocessor memorizes the binary coded decimal switch value as a percentage error at the previously established pulse rate.

In an alternate method, to program the pulser system with multi-point calibration data, the data switches located along the top edge of the pulser circuit board are set to the appropriate values to represent the flow rate in pulse edges per second for the meter. In the preferred embodiment, the right-most switch (sw1) is reserved for an extra digit to establish positioning (left-shifting) of the decimal point. For example, a pulse rate of 3704 would be entered as 37040, where the last digit ("0") specifies the positioning of the decimal point, in this case, no left-shifting. If desired, individual calibration points may be disabled by entering any number less than −3.000.

To enter the new flow rate value into memory, the data entry pushbutton located on the control panel is depressed. The LED display scrolls the new value to verify that it has been successfully loaded into memory. Preferably, if the data was not accepted, an error code is displayed.

Next, the data switches located along the top edge of the control panel are set to the appropriate values to represent the percent error for a meter at that flow rate. The data entry pushbutton is depressed to enter the new error percentage value into memory. The LED display preferably scrolls the flow rate and percentage error so the user may verify that the value has been successfully loaded into memory, e.g. "F3704 P0.1".

The identical operations for additional flow rates are provided by moving the Function Switch to the "1" position (and then entering data), then to the "2" position, and so forth, for a maximum of up to sixteen flow rates.

If no multi-point calibration data has been previously entered into a switch position, the LED display scrolls "E20". If there is no data or if data values need to be changed, it is preferable to initiate a prover run at the highest flow rate for the meter, with the function switch set in the new switch position. When the flow rate is stable, the data entry pushbutton is pressed. The display scrolls the pulse rate that has been captured by the pulser at that flow rate. For example, a meter operating at a flow rate of 100 gallons per minute provides a nominal pulse rate of 3704 pulse edges per second for which the display would scroll "F3704".

Next, delivery error is calculated as follows:

$$\% \text{ Error} = \frac{(\text{Prover volume} - \text{Meter volume})}{\text{Prover volume}} \times 100$$

$$\text{Example:} \quad \% \text{ Error} = \frac{100.15 - 100.17}{100.15} \times 100 = -0.01997\%$$

Next, with no flow through the meter and still in the function where the pulse rate was captured, the data switches are set to specify the above calculated error at the given flow rate. Using the above example, the error of −0.01997% would first be rounded to 3 significant digits (in accordance with Weights & Measures rules) to −0.020, and then entered on the data switches as "00203". Once the error value has been set on the data switches, the data entry pushbutton may be pressed to enter the value in memory. The LED display will now scroll the new value, e.g. "F3704 P−0.02".

To program the pulser scaler system with volume compensation parameters, bank "0" is selected, the function switch is set to the desired compensation table, and the data switches are set to the desired VCF parameter. The data entry pushbutton is depressed to enter the value placed on the data switches. The LED display will scroll "Cxx.xx Px.xxx" or "Fxx.xx Px.xxx" where the first value represents the temperature in Celsius or Fahrenheit as sensed by the RTD probe, and the second value represents the VCF parameter.

Temperature volume compensation permits accurate "net" volumetric deliveries of product taking into account the thermal expansion or contraction of the liquid with changes in temperature. Preferably, temperature volume compensation corrects the delivery of fluid to a standard reference volume at a liquid temperature of 60F. or 15C. Additional functions are provided for adjusting the k-factor in accord with other factors. In the preferred embodiment, the k-factor may be adjusted by 0 to 0.0025 per degree Fahrenheit, by 0 to 0.005 per degree Celsius, by API Table 24 from 0.500 to 0.550 SGU, by API Table 54 from 0.500 to 0.600 SGU, by API Table 54A from 610.5 to 1075.0 kg/m$^3$, by API Table 54B from 653 to 1075.0 kg/m$^3$, by API Table 54C from 0.000486 to 0.001674 per degree Celsius, by API Table 54D from 800 to 1164 kg/m$^3$, by API Table 6B from 0 to 85 API gravity, and by the NH$_3$ Industry Canada Standard.

A third function bank 0, Function F, allows for the setting of a low resolution pulse output signal for indicating the total volume of the flow meter. The Function F k-factor is typically a multiple of the gross k-factor. This parameter may be referred to as an electromechanical pulse output scale factor, as it is preferably provided to an electromechanical counter for monitoring the total flow over the life of the flow meter. For programming, the switch value is set and is read in when the pushbutton is pressed. The value read in is interpreted as a scale factor for the electromechanical pulse output scaling. In the preferred embodiment, the output pulse is a single shot 20 millisecond ON pulse. This pulse is preferably provided as a signal to an electromechanical or electronic counter for accumulating a usage total for the meter. In an alternate embodiment, this parameter is programmed to all zeros or left unprogrammed, whereby it is defined as a fault output (typically used in applications that must meet the Canadian Weights and Measures standards). The third function may alternately be used to operate a fault indicator such as an LED or relay. Applications of this feature include indication of a fault condition or shut down of a pump during a fault.

A temperature offset adjustment factor may be entered in a fourth function. Such an adjustment may be made so that the temperature reading of the pulser system matches the temperature of an inspection/calibration test measurement. The offset adjustment is in effect a mechanism for tweaking the pulser system temperature reading. The reading provided by the pulser system temperature probe may be adjusted to match the reading taken by the Weights and Measures thermometer, for example.

The temperature adjustment may be entered by selecting the adjustment parameter with the switches and then pushing the pushbutton to enter the selected parameter. The system is preferably programmed to calculate the current temperature reading and flash (sequentially) the temperature reading value digits on the LED display.

Referring to FIG. 5, a temperature adjustment may be entered as follows:

Set the function switch to the "C" position. The LED will scroll "A0 Cxx.xx" or "A0 Fxx.xx", where "A0" indicates the adjustment offset value has been set to zero, "Cxx.xx" indicates the current temperature in degrees Celsius, and "Fxx.xx" indicates the current temperature in degrees Fahrenheit.

Enter the temperature scale (Celsius or Fahrenheit) on the data switches. In the present embodiment, to select Celsius as the temperature scale, set the switches to 10003 and depress the data entry pushbutton. To select Fahrenheit as the temperature scale, set the switches to 20003 and depress the data entry pushbutton.

Enter the temperature adjustment on the data switches required to match the Weights & Measures thermometer reading and depress the data entry pushbutton. The LED display will now scroll "Ay.yy Cxx.xx" or "Ay.yy Fxx.xx" depending on the temperature scale selected.

In an alternate embodiment, a temperature amplifier/ADC may be calibrated with resistors of known magnitudes. For example, resistors of 100 Ohms may be selected for 0 C. and resistors of 128.6 Ohms may be selected for 74 C.

A fifth function may be selected to allow the pulse encoder to communicate with a processing device by switching the encoder to a digital configuration loading mode. In the preferred embodiment, the digital configuration loading mode allows the pulse encoder to communicate with a computer via a serial communication channel (preferably a RS-232 port). In this embodiment, the pulse encoder system may receive the operating software directly from the computer. The computer may also receive and display the memory contents of the pulse encoder system, i.e., the units configuration parameters. This port may also be used to calibrate the offset and slope of the temperature circuitry, load or read calibration parameters, and/or facilitate setup of a unit to minimize the number of switch entered parameters.

A sixth function may be set to display any current error codes in the pulse encoder display. In the preferred embodiment, an LED is included as the display for providing a visual indication of the operation of the pulse encoder system. Error codes may be displayed as coded numbers and scrolled through the seven segment LED display. The meaning of each coded number is preferably provided in a reference manual. Potential faults include a temperature reading that is out of range and a fault indicating that one of the channels of the pulse encoder has failed.

If the sixth parameter is not set to display error codes, the LED display may sequentially display the value of the parameters being entered in one of the other modes, corresponding to a particular parameter. When an error is detected, the error code is displayed, regardless of the position of the switch. The error code is cleared when the pushbutton is pressed, or when a different function code is selected. A displayed error code is cleared by selecting a different function code with the function switch, pressing the pushbutton after entering a valid value, or cycling power to the unit. The following table defines error codes displayed in the preferred embodiment:

TABLE B

| Error Number | Description | Quadrature Active |
|---|---|---|
| 0 | No error has occurred. | Yes |
| 1 | Range error. The value read when the pushbutton was pressed is outside the valid range limit for the field selected. | Yes |
| 2 | Switch range error. The raw value read from the switches is out of range. | Yes |
| 10 | An attempt was made to calibrate the A to D converter at the 128.6 ohm resistor value before calibration was done at the 100.0 ohm resistor value. | Yes |
| 20 | The linearization point has not been set up and is disabled. | Yes |
| 21 | Duplicate flow rates in linearization table. | Yes |
| 22 | An attempt was made to set the percent error field of a linearization point but the flow rate has not been set for the point. | Yes |
| 30 | Flash write attempted with write protect enabled. | Yes |
| 40 | The temperature volume compensation parameter has not been set. | No |
| 100 | The code space of the electronic circuit has been corrupted and needs to be reloaded. | No |
| 110 | Pulser fault error. An excessive number of pulser reversals has occurred. | No |
| 111 | Scalar adjustment range error. The quadrature scalar was adjusted so that it represents a k-factor less than 4. | No |

TABLE B-continued

| Error Number | Description | Quadrature Active |
|---|---|---|
| 120 | Adjacent points in the linearization table have percent errors with a difference greater than 0.25. | No |
| 121 | Incomplete linearization table setup. A flow rate was set for a point but the percent error field was not set. | No |
| 130 | Flash read error. | No |
| 131 | Flash write error. | No |
| 140 | Current temperature out of range for volume compensation type selected. | No |

In an alternate embodiment, the pulser automatically compensates for changes in volume flow due to temperature variations through the provision of a digital temperature sensor. In this embodiment, the pulser includes a RS-485 communication port for interfacing to a digital temperature transmitter.

The following is a description of a preferred configuration for a system that can perform in accordance with the description of the preferred embodiment described above. In the preferred embodiment, the scaled pulser system is controlled by an 89C51RD+ microprocessor. The system also includes a binary coded decimal (BCD) switch reader module for reading six BCD switches and returning the switch readings as a function number and a five digit integer. Preferably the first five switches are returned as a 32-bit unsigned integer in the range of 0–99999. The sixth switch and the bank select switch provide the command byte and are returned as an 8-bit unsigned integer in the range of 0–31. The processor converts the 32-bit unsigned integer from its raw value to a 32-bit signed floating point value in IEEE-754 format.

The pushbutton hardware is connected to an external interrupt line of the microprocessor. The pushbutton interrupt service routine reads the function number and integer value from the BCD switches. The number is sent to a 4k flash memory chip for non-volatile storage and is also written to RAM. The calibration parameters are stored in a 4k non-volatile flash memory chip. A first timer periodically generates interrupt signals for input to the microprocessor, preferably every 62.5 ms. The following tasks are preferably performed:

Every 0.5 second, the seven segment display is updated to the next character, a temperature reading is taken, the flow rate is retrieved, and the no-flow indicator is checked for a no-flow condition. Every 0.25 second, fatal flow errors are checked for and reported. If the function switch is set to function 1 through 9, or A, the value received from the temperature sensor is used to adjust the k-factor. The absolute value of the current flow rate is used to perform the linearization of the points previously entered, and the k-factor is adjusted accordingly. To minimize the overhead of the k-factor adjustment algorithms, the temperature and flow rate adjustments are performed 0.25 seconds out of phase of one another. If no flow has occurred within 0.5 second, the pulser fault and temperature error bits are cleared to enable the meter for the next flow condition.

There are two processes that make up the multi-point linearization feature. One process sets up the table of points; the other process uses those points during flow.

To set up the table of points, the operator selects which point to work with via the bank select jumper and the function selection switch. Once the point to work with has been selected, pressing the pushbutton causes the current flow rate to be checked. If the flow rate is not zero, it is saved as the flow rate for the current point and the percent error field is cleared to zero. If the flow rate is zero, the data entry switches are read and the value is saved as the percent error at the flow rate previously set for the point. If the value read from the switches is an integer greater than the 3% limit, the value is assumed to be the flow rate for the point. A linearization point is disabled by entering a value less than −3.0.

When the bank select jumper is moved to "0" and the function selector switch is moved to position 0 through 9, or A, the linearization fields are sorted in decreasing order by flow rate. As the table is sorted, each point is checked to ensure that the error settings of its adjacent points are within 0.25 percent of its error setting (the maximum allowed by Canadian Weights and Measures). If this check fails, the seven segment display reports the error condition and metering capabilities are disabled.

The linearization points are used in the periodic timer interrupt service routine. Every ½ second the absolute value of the flow rate is calculated. The table of linearization points is then searched to find the two entries that straddle the current flow rate. The percent error that is used to adjust the k-factor, represented by the variable E below, is then calculated as a linear interpolation between the two points using the following algorithm:

R=Absolute value of current flow rate.

$R_n$=Flow rate of point n that is greater than R.

$R_{n+1}$=Flow rate of point n+1 that is less than or equal to R.

$E_n$=Percent error at flow rate $R_n$.

$E_{n+1}$=Percent error at flow rate $R_{n+1}$.

$$E=(E_n-E_{n+1})*(R-R_{n+1})/(R_n-R_{n+1})+E_{n+1}$$

The adjusted k-factor will then be calculated as follows:

Adjusted k-factor=Raw k-factor*(1−(E/100))

The following exceptions are noted:

1. If the first entry in the linearization table has a flow rate of zero, i.e. if the table is empty, the algorithm is skipped and the K-factor is not adjusted.
2. If R is greater than or equal to the flow rate of the first table entry then E will be set to the first entry's percent error.
3. If R is less than the flow rate of the last used table entry then E will be set to the last used entry's percent error.

In the preferred embodiment, the microprocessor is programmed with ten temperature compensation types as outlined in the following table:

TABLE C

| VCF Type | Scale | Parameter Range | Base Temp. | Minimum Temp. | Maximum Temp. | Hold Temp. |
|---|---|---|---|---|---|---|
| None | C. or F. | N/A | N/A | N/A | N/A | N/A |
| Linear F | F. | 0–0.0025 | 60 | −130 | +212 | −130 |
| Linear C | C. | 0–0.005 | 15 | −90 | +100 | −90 |
| Table 24 | F. | 0.500–0.550 | 60 | −50 | +140 | −50 |
| Table 54 | C. | 0.500–0.600 | 15 | −46 | +60 | −46 |
| Table 54A | C. | 610.5–1075.0 | 15 | −50 | +95 | −40 |
| Table 54B | C. | 653.0–1075.0 | 15 | −50 | +95 | −40 |
| Table 54C | C. | 0.000486–0.001674 | 15 | −50 | +95 | −40 |
| Table 54D | C. | 800–1164 | 15 | −50 | +95 | −40 |
| Table 6B | F. | 0–85 | 60 | −50 | +200 | −40 |
| $NH_3$ | C. | N/A | 15 | −30 | +40 | −30 |

If the VCF type selected is not "None" and if the current temperature falls outside the range specified in the table above for the VCF type being used, the seven segment display will report the error condition and metering capabilities will be disabled. Once a no-flow condition occurs, the error will be reset and the metering capabilities will be re-enabled.

The raw pulser input is connected to external interrupt line 0. The line is configured as an edge triggered interrupt. For every raw pulse that occurs, the signal to the interrupt line goes from a high to a low state, thus causing the interrupt to occur. IE0 is set to 1 at the time of the interrupt and is cleared when the ISR is called.

One task of the ISR is to add or subtract the adjusted quadrature k-factor into the quadrature totalizer and then set the channel A and B outputs to a 0 or 1 depending on the half bit and quarter bit of the totalizer. As discussed above, in the preferred embodiment, Channel A is set to the exclusive-or of the half bit and quarter bit; Channel B is set to the value of the half bit.

Also, the adjusted electromechanical k-factor is added to/subtracted from the electromechanical totalizer. When the carry flag is set due to the change, the electromechanical output is turned on and a 20 ms timer is started. When the timer expires, the electromechanical output is turned off.

In the preferred embodiment, the ISR also updates the flow rate count that is used by the linearization routines. The flow rate is the number of interrupts that have occurred within the last ½ second multiplied by 2 which then represents the number of interrupts per second. Finally, the ISR also preferably detects excessive pulser reversals. If a maximum pulser reversal count is exceeded, an appropriate error code is displayed and metering capabilities are disabled.

The present invention has been described in the context of a preferred and alternate embodiments, as well as a system into which the invention may be incorporated. It is apparent to those skilled in this art, however, that modifications and variations to the disclosed embodiments can be made without departing from the spirit and scope of the invention. Accordingly, this invention is to be construed and limited only by the scope of the appended claims.

We claim:

1. A method for providing a scaled quadrature pulse signal for metering the flow of a product, said method comprising:

receiving a plurality of first pulses and second pulses from a flowmeter representative of a product quantity;

scaling said plurality of first pulses and said second pulses based upon select criteria;

totalizing said plurality of first and second pulses; and providing a scaled quadrature output signal based upon said totalized first and second pulses;

wherein said scaled output quadrature signal comprises a two bit signal and wherein a change of state of at least one bit of said two bit signal occurs only when the product quantity changes by 0.25 of a unit of volume.

2. The method of claim 1 further comprising:

representing product flow in a first direction when a first bit of said two bit signal leads a second bit of said two bit signal, and representing product flow in a second direction, opposite from said first direction, when a second bit of said two bit signal leads a first bit of said two bit signal.

3. The method of claim 1 wherein said select criteria include non-linear characteristics of said flowmeter.

4. The method of claim 3 wherein said scaling step includes:

scaling said plurality of first pulses and second pulses in accord with a first scaling factor if said plurality of first pulses and second pulses are received at a or below a first rate; and scaling said plurality of first pulses and second pulses in accord with a second scaling factor, different from said first scaling factor, if said plurality of first pulses and second pulses are received above said first rate.

5. The method of claim 1, further comprising:

programming a microprocessor for receiving, scaling, and totalizing said plurality of first pulses and second pulses.

6. The method of claim 1, further comprising:

modifying the scaling said plurality of first pulses and said second pulses based upon changes in volume flow of said product due to temperature variations.

7. The method of claim 1 wherein said scaling step includes:

determining the absolute value of the flow of the product;

searching a table of linearization points having a plurality of entries to find a first and a second of said plurality of entries that are greater than and less than, respectively, said absolute value of the flow of the product;

interpolating a percent error using said absolute value of said flow of the product and said first and second of said plurality of entries; and calculating a scaling factor using said interpolated percent error.

8. An apparatus for receiving a flow meter signal comprising a plurality of pulses representing a product quantity and for providing a scaled quadrature output signal indicating flow direction and flow volume in predetermined increments, said apparatus comprising:

a user interface for receiving at least one scaling factor for said plurality of pulses;

a totalizer for applying said at least one scaling factor to said plurality of pulses for providing a scaled quantity for each pulse and for summing each scaled quantity; and an output signal generator for providing a scaled quadrature pulse output signal based upon said each scaled quantity provided by said totalizer;

wherein said scaled output quadrature signal comprises a two bit signal and wherein the change of state of at least one bit occurs only when the product quantity changes by 0.25 of a unit of volume.

9. The apparatus of claim 8 wherein said user interface, said totalizer, and said output signal comprise a microprocessor based system.

10. The apparatus of claim 8 wherein said user interface comprises:

a plurality of data switches for representing binary coded decimal values for setting at least one value for said at least one scaling factor;

a function switch for designating one of a plurality of select scaling factors; and a pushbutton configured for providing a pushbutton signal upon activation; and a microprocessor programmed for receiving said pushbutton signal and for responsively setting said designated one of a plurality of select scaling factors to said at least one value represented by said plurality of switches.

11. The apparatus of claim 8 wherein said scaled quadrature pulse output signal comprises a first square pulse signal having a plurality of first rising edges and a plurality of first falling edges and a second square pulse signal having a plurality of second rising edges and a plurality of second falling edges, wherein the phase relationship between said second square pulse signal and said first square pulse signal is 90°.

12. The apparatus of claim 11 wherein said predetermined increment is 25% of a unit volume of product.

13. The apparatus of claim 8 wherein said user interface receives a plurality of scaling factors, said apparatus comprising:

a processor programmed for calculating an interpolated scaling factor, wherein said totalizer applies said interpolated scaling factor to said plurality of pulses for providing said scaled quantity for each said pulse and for summing each scaled quantity.

14. An apparatus for receiving a flow meter signal and for calculating a scaling factor, said apparatus comprising:

a database programmed with a plurality of linearization points, wherein each linearization point comprises a flow rate and an associated percentage error;

a processor for receiving said flow meter signal, for determining an unscaled flow rate, for obtaining from said database a first and a second flow rates which are greater than and less then, respectively, said unscaled flow rates, for calculating a scaling factor and for applying said scaling factor to the flow meter signal to provide a scaled quadrature output signal.

* * * * *